(12) United States Patent
Webb et al.

(10) Patent No.: US 11,884,824 B2
(45) Date of Patent: Jan. 30, 2024

(54) THERMOPLASTIC ACRYLONITRILE CONTAINING COPOLYMER/LIGNIN BLENDS

(71) Applicant: Prisma Renewable Composites, LLC, Knoxville, TN (US)

(72) Inventors: Christopher D. Webb, Knoxville, TN (US); Adam A. McCall, Knoxville, TN (US); William M. Sanford, Knoxville, TN (US); Deborah Burkwit, Knoxville, TN (US); Darren Baker, Knoxville, TN (US)

(73) Assignee: Prisma Renewable Composites, LLC, Knoxville, TN (US)

( * ) Notice: Subject to any disclaimer, the term of this patent is extended or adjusted under 35 U.S.C. 154(b) by 0 days.

(21) Appl. No.: 16/848,123

(22) Filed: Apr. 14, 2020

(65) Prior Publication Data

US 2020/0325311 A1 Oct. 15, 2020

Related U.S. Application Data

(60) Provisional application No. 62/833,973, filed on Apr. 15, 2019.

(51) Int. Cl.
*C08L 9/06* (2006.01)
*C08L 55/02* (2006.01)
*C08L 97/00* (2006.01)

(52) U.S. Cl.
CPC .............. *C08L 9/06* (2013.01); *C08L 55/02* (2013.01); *C08L 97/005* (2013.01); *C08L 2205/035* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 2,698,213 | A | * | 12/1954 | Daly | A47B 17/036 312/239 |
| 2006/0006564 | A1 | * | 1/2006 | Maldas | B27N 3/007 264/40.1 |
| 2006/0264579 | A1 | * | 11/2006 | Ellington | C08L 55/02 525/438 |
| 2015/0011714 | A1 | * | 1/2015 | Ichihara | C08K 5/3435 525/420 |
| 2017/0015828 | A1 | * | 1/2017 | Naskar | C08L 9/02 |
| 2018/0072889 | A1 | | 3/2018 | Ying et al. | |
| 2018/0346708 | A1 | * | 12/2018 | Malet Murillo | C08L 55/02 |
| 2019/0062508 | A1 | * | 2/2019 | Winsness | C08L 55/02 |

FOREIGN PATENT DOCUMENTS

| | | | | |
|---|---|---|---|---|
| CN | 103225468 | A | * | 7/2013 |
| CN | 103396675 | A | * | 11/2013 |
| CN | 105694119 | A | * | 6/2016 |
| CN | 107226993 | A | | 10/2017 |
| CN | 107987520 | A | * | 5/2018 |
| CN | 108659447 | A | * | 10/2018 ............. C08L 55/02 |
| CN | 108659451 | A | * | 10/2018 |
| CN | 109517119 | A | * | 3/2019 |
| DE | 102014215627 | A1 | | 2/2016 |
| EP | 3647366 | A1 | | 5/2020 |
| WO | WO-2017165957 | A1 | * | 10/2017 |

OTHER PUBLICATIONS

Matuana, "Composites of Acrylonitrile-Butadiane-Styrene Filled with Wood-Flour", 2007, Polymers & Polymer Composites, Vo. 15, No. 5, pp. 365-370 (Year: 2007).*
Derwent Abstract of CN 105694119 A (Year: 2016).*
Song, "Effect of Lignin Incorporation and Reactive Compatibilization on the Morphological, Rheological, and Mechanical Properties of ABS Resin", Journal of Macromolecular Science, Part B: Physics, 2012, 51: 720-735 (Year: 2012).*
Shen, "Pre-treatments for enhanced biochemical methane potential of bamboo waste", Chemical Engineering Journal , 2014, 204, 253-259 (Year: 2014).*
Kang, Derwent Abstract of CN 103351569 A (Year: 2014).*
Akato, "Poly(ethylene oxide)-Assisted Macromolecular Self-Assembly of Lignin in ABS Matrix for Sustainable Composite Application", ACS Sustainable Chem. Eng. 2015, 3, 3070-3076. (Year: 2015).*
Fu, Derwent Abstract of CN 105659447 A (Year: 2018).*
Li, "Reparation of recycled acrylonitrile—butadiene—styrene by pyromellitic dianhydride: Reparation performance evaluation and property analysis", Polymer, 2017, 124, 41-47 (Year: 2017).*
Tian "Structural Characterization of Lignin Isolated from Wheat-Straw during the Alkali Cooking Process", BioResources, (2017), 12(2), 2407-2420 (Year: 2017).*

(Continued)

*Primary Examiner* — Nicole M. Buie-Hatcher
(74) *Attorney, Agent, or Firm* — Wood Herron & Evans LLP

(57) ABSTRACT

A thermoplastic acrylonitrile containing copolymer/lignin blend, e.g., thermoplastic acrylonitrile-butadiene-styrene copolymer/lignin blend, is provided, whereas the blend comprises (i) an amount of thermoplastic acrylonitrile containing copolymer (e.g., acrylonitrile-butadiene-styrene copolymer); (ii) an amount of lignin; (iii) an amount of compatibilizing agent, such as phthalic anhydride, capable of imparting improved ductility and impact strength to the resultant blend and (iv) optionally an amount of at least one additive to impart specific properties including, but not limited, to resistance to ultraviolet radiation, resistance to oxidation, flame retardance, color, surface friction, or surface static charge accumulation. Methods of improving impact strength and/or ductility of, for example, a thermoplastic acrylonitrile-butadiene-styrene copolymer/lignin blend and articles made therefrom are also disclosed.

22 Claims, No Drawings

(56) References Cited

OTHER PUBLICATIONS

Pingan Song et al, "Thermal Degradation and Flame Retardancy Properties of ABS/lignin: Effects of Lignin Content and Reactive Compatibilization", Thermochimica Acta, Elsevier Science Publishers, Amsterdam, NL, vol. 518, No. 1, Feb. 3, 2011, pp. 59-65.

Sailaja R R N et al, "Mechanical and Thermal Properties of Compatibilized Composites of Polyethylene and Esterified Lignin", Materials and Design, London, GB, vol. 31, No. 9, Oct. 1, 2010, pp. 4369-4379.

European Patent Office, Extended Search Report issued in EP 20169350.4 dated Aug. 18, 2020.

\* cited by examiner

THERMOPLASTIC ACRYLONITRILE CONTAINING COPOLYMER/LIGNIN BLENDS

TECHNICAL FIELD

The present invention relates generally to thermoplastic acrylonitrile containing copolymer/lignin blends and, more specifically, to improved thermoplastic composites of acrylonitrile containing copolymers, such as acrylonitrile-butadiene-styrene copolymer, and lignin and methods of making the same having enhanced ductility and impact properties.

BACKGROUND

Thermoplastic acrylonitrile containing copolymers, such as copolymers of acrylonitrile, butadiene, and styrene, known as ABS plastics, are a useful family of thermoplastic resins with broad applications in automotive, marine, home appliance, toys and other industries. Lignin has been proposed as a useful additive to ABS plastics, for example, to provide increased stiffness and reduce cost. Additionally, since lignin is a natural product, its incorporation in plastics like ABS adds renewable content and reduces the environmental impact of these materials. However, lignin is generally incompatible with ABS polymers, for example, forming large domains of lignin with poor interfacial adhesion with the ABS matrix. This morphology leads to significant reductions in the impact strength and ductility of the resulting composite, thereby limiting their practical utility.

It thus would be beneficial to provide improved thermoplastic acrylonitrile containing copolymer/lignin blends, such as thermoplastic acrylonitrile-butadiene-styrene copolymer/lignin blends, and methods of making the same, such as for automotive use, that have enhanced ductility and impact properties so as to overcome one or more of the aforementioned drawbacks of current ABS/lignin blends, for example.

SUMMARY

In one embodiment, a thermoplastic acrylonitrile containing copolymer/lignin blend, e.g., an acrylonitrile-butadiene-styrene copolymer/lignin blend, is provided. The blend can comprise: (i) an amount of thermoplastic acrylonitrile containing copolymer, such as an acrylonitrile-butadiene-styrene copolymer; (ii) an amount of lignin; (iii) an amount of compatibilizing agent capable of imparting improved ductility and/or impact strength to the resultant blend, and optionally (iv) an amount of one or more additives to impart specific properties including, but not limited to, resistance to ultraviolet radiation, resistance to oxidation, flame retardance, color, reduced surface static charge buildup, and low surface friction.

In one example, the thermoplastic acrylonitrile containing copolymer includes a styrene-acrylonitrile (SAN) copolymer. In another example, the thermoplastic acrylonitrile containing copolymer may be replaced or further combined with other thermoplastic polymers, such as polypropylene, a copolymer of propylene and ethylene, or a polyamide.

In one example, the lignin is a Kraft lignin. In another example, the lignin is an organosolv lignin. In another example the lignin is a soda lignin.

In one example, alone or in combination with any one of the previous examples, the compatibilizing agent can be one or more of polyalkylene oxides, ether-containing copolymers, polyalkyl-maleic anhydride copolymers, vinyl-maleic anhydride copolymers, polyalkylhydroxyl copolymers, polymethyl methacrylate, a polycarbonate, and olefin-vinyl acetate copolymers. In another example, alone or in combination with any of the previous examples, the compatibilizing agent is one or more of a polyvinyl alcohol, polyvinyl acetate, a copolymer of ethylene and vinyl acetate, a copolymer of ethylene, vinyl acetate and carbon monoxide, a maleic anhydride grafted copolymer of ethylene and vinyl acetate, a maleic anhydride grafted styrene-ethylene-butadiene-styrene block copolymer, a maleic anhydride grafted acrylonitrile-butadiene-styrene copolymer, or a copolymer of styrene and maleic anhydride.

In another example, alone or in combination with any of the previous examples, the compatibilizing agent can be selected from one or more of acrylonitrile-butadiene copolymer (also known as nitrile rubber), an acrylonitrile-butadiene-styrene copolymer having a butadiene content of butadiene at least 50% by weight, polyethylene glycol, and an anhydride such as maleic anhydride, phthalic anhydride, or succinic anhydride. In one example, the combination of compatibilizing agents can include an acrylonitrile-butadiene copolymer, an acrylonitrile-butadiene-styrene copolymer having a butadiene content of at least 50% by weight, and polyethylene glycol with a molecular weight between about 5,000 and 50,000. In another example, the combination of compatibilizing agents can include an acrylonitrile-butadiene copolymer, an acrylonitrile-butadiene-styrene copolymer with a butadiene content of at least 50% by weight, and maleic anhydride and/or phthalic anhydride. In still another example, the combination of compatibilizing agents can include an acrylonitrile-butadiene copolymer and an acrylonitrile-butadiene-styrene copolymer with a butadiene content of at least 50% by weight.

In another example, alone or in combination with any of the previous examples, the additive is a UV stabilizer, such as a benzotriazole, benzophenol, or sterically hindered amine light stabilizer.

In another example, alone or in combination with any of the previous examples, the additive is an antioxidant, such as a phosphite ester or a sterically hindered phenol.

In another example, alone or in combination with any of the previous examples, the additive is a flame retardant, such as an organic phosphate, a brominated organic compound, or antimony trioxide.

In another example, alone or in combination with any of the previous examples, the additive is a colorant particle such as carbon black, titanium dioxide, zinc oxide, or any pigment commonly used to impart color to plastics.

In another example, alone or in combination with any of the previous examples, the additive is a slip agent, such as a fatty acid amide, fatty acid ester, or metallic stearate (e.g., zinc stearate).

In another example, alone or in combination with any of the previous examples, the additive is an anti-static agent, such as an ethoxylated fatty acid amine, a diethanolamide, or glycerol monostearate.

In another embodiment, a method for improving the ductility and/or impact strength of an article including a thermoplastic acrylonitrile containing copolymer, e.g., an acrylonitrile-butadiene-styrene copolymer, and lignin is provided and includes melt blending: (i) an amount of thermoplastic acrylonitrile containing copolymer, e.g., a thermoplastic acrylonitrile-butadiene-styrene (ABS) copolymer; (ii) an amount of lignin; (iii) a compatibilizing agent; and optionally (iv) one or more additives to impart specific properties including, but not limited to, resistance to ultraviolet radiation, resistance to oxidation, flame retardance, color, reduced surface static charge buildup, and low surface friction; forming a substantially homogeneous blend of (i)-(iv); and forming an article from the substantially homogeneous blend, wherein the article has at least 50% greater notched izod impact strength and/or 50% greater elongation at break than an article of, for example, the ABS copolymer and lignin, at the same weight fraction of lignin, respectively, without the presence of the compatibilizing agent.

In one example, the lignin is a Kraft lignin. In another example, the lignin is an organosolv lignin.

In one example, alone or in combination with any one of the previous examples, the compatibilizing agent can be one or more of polyalkylene oxides, ether-containing copolymers, polyalkyl-maleic anhydride copolymers, vinyl-maleic anhydride copolymers, polyalkylhydroxyl copolymers, polymethyl methacrylate, a polycarbonate, and olefin-vinyl acetate copolymers. In another example, alone or in combination with any of the previous examples, the compatibilizing agent is one or more of a polyvinyl alcohol, polyvinyl acetate, a copolymer of ethylene and vinyl acetate, a copolymer of ethylene, vinyl acetate and carbon monoxide, a maleic anhydride grafted copolymer of ethylene and vinyl acetate, a maleic anhydride grafted styrene-ethylene-butadiene-styrene block copolymer, a maleic anhydride grafted acrylonitrile-butadiene-styrene copolymer, or a copolymer of styrene and maleic anhydride.

In another example, alone or in combination with any of the previous examples, the compatibilizing agent can be selected from one or more of acrylonitrile-butadiene copolymer (also known as nitrile rubber), an acrylonitrile-butadiene-styrene copolymer having a butadiene content of butadiene at least 50% by weight, polyethylene glycol, and an anhydride such as maleic anhydride, phthalic anhydride, or succinic anhydride. In one example, the combination of compatibilizing agents can include an acrylonitrile-butadiene copolymer, an acrylonitrile-butadiene-styrene copolymer having a butadiene content of at least 50% by weight, and polyethylene glycol with a molecular weight between about 5,000 and 50,000. In another example, the combination of compatibilizing agents can include an acrylonitrile-butadiene copolymer, an acrylonitrile-butadiene-styrene copolymer with a butadiene content of at least 50% by weight, and maleic anhydride and/or phthalic anhydride. In still another example, the combination of compatibilizing agents can include an acrylonitrile-butadiene copolymer and an acrylonitrile-butadiene-styrene copolymer with a butadiene content of at least 50% by weight.

In another example, alone or in combination with any one of the previous examples, the compatibilizing agent comprises from about 0.5 to 25% by weight of the total weight of the blend. In another example, alone or in combination with any one of the previous examples, the compatibilizing agent comprises from about 0.5 to 10% by weight of the total weight of the blend. In another example, alone or in combination with any one of the previous examples, the acrylonitrile-butadiene-styrene copolymer/lignin blend exhibits a notched izod impact strength of at least 5 kJ/m$^2$ and an elongation at break of at least 2%.

In another example, alone or in combination with any of the previous examples, the additive is a UV stabilizer, such as a benzotriazole, benzophenol, or sterically hindered amine light stabilizer.

In another example, alone or in combination with any of the previous examples, the additive is an antioxidant, such as a phosphite ester or a sterically hindered phenol.

In another example, alone or in combination with any of the previous examples, the additive is a flame retardant, such as an organic phosphate, a brominated organic compound, or antimony trioxide.

In another example, alone or in combination with any of the previous examples, the additive is a colorant particle such as carbon black, titanium dioxide, zinc oxide, or any pigment commonly used to impart color to plastics.

In another example, alone or in combination with any of the previous examples, the additive is a slip agent, such as a fatty acid amide, fatty acid ester, or metallic stearate (e.g., zinc stearate).

In another example, alone or in combination with any of the previous examples, the additive is an anti-static agent, such as an ethoxylated fatty acid amine, a diethanolamide, or glycerol monostearate.

In a third example, a composite article is provided comprising the acrylonitrile-butadiene-styrene copolymer/lignin blend.

In a fourth example, a method for preparing a thermoplastic acrylonitrile containing/lignin copolymer composite, e.g., a thermoplastic acrylonitrile-butadiene-styrene/lignin copolymer composite, is provided and includes melt blending: (i) a thermoplastic acrylonitrile containing copolymer, e.g., a thermoplastic acrylonitrile-butadiene-styrene (ABS) copolymer; (ii) lignin; (iii) a compatibilizing agent; and optionally (iv) one or more additives to impart specific properties including, but not limited, to resistance to ultraviolet radiation, resistance to oxidation, flame retardance, color, reduced static charge buildup, and low surface friction; and forming a composite article, wherein the composite article has a notched izod impact strength of at least 5 kJ/m$^2$ and/or an elongation at break of at least 2%. In one example, the composite article has a notched izod impact strength of at least 5 kJ/m$^2$ and/or an elongation at break of at least 2%. In one example, a composite article manufactured according to the fourth example is provided.

DETAILED DESCRIPTION

The present disclosure relates to compositions and methods to produce improved composites of thermoplastic acrylonitrile containing copolymers, e.g., ABS, and lignin with enhanced ductility and/or impact properties through the use of appropriate compatibilizing agents and optionally various additives that can impart attributes relevant to specific intended end use applications and compounding techniques.

The presently disclosed polymer blend comprises (i) a thermoplastic acrylonitrile containing copolymer component, e.g., an ABS polymer component, (ii) a lignin component, (iii) at least one compatibilizing agent, and optionally (iv) at least one additive.

Thermoplastic Acrylonitrile Containing Copolymer

In one example, the thermoplastic acrylonitrile containing copolymer is an "acrylonitrile butadiene styrene" or "ABS", which are used interchangeably herein. The ABS can have any of a wide range of weight-average molecular weights (Mw), such as precisely, about, at least, above, up to, or less than, for example, 2,500 g/mol, 3,000 g/mol, 5,000 g/mol, 10,000 g/mol, 50,000 g/mol, 100,000 g/mol, 150,000 g/mol, 200,000 g/mol, 300,000 g/mol, 400,000 g/mol, 500,000 g/mol, or 1,000,000 g/mol, or a molecular weight within a range bounded by any two of the foregoing exemplary values. The ABS may also have any of a wide range of number-average molecular weights Mn, wherein Mn can correspond to any of the numbers provided above for Mw. The ABS can be from any commercial supplier.

For purposes of the disclosure, the ABS has an acrylonitrile content of at least 15 mol %. In different embodiments, the ABS has molar proportions of about 15 mol % to about 50 mol % acrylonitrile, about 5 mol % to about 30 mol % butadiene, about 40 mol % to about 60 mol % styrene, or a range bounded by any three of the foregoing values.

In one example, the thermoplastic acrylonitrile containing copolymer is a styrene-acrylonitrile (SAN) copolymer.

In another example, the thermoplastic acrylonitrile containing copolymer may be replaced or be further combined with other thermoplastic polymers, such as polypropylene, a copolymer of propylene and ethylene, or a polyamide.

In the polymer blend material, the lignin component (ii) is present in an amount of at least 5 wt % and up to about 50 wt % by total weight of the polymer blend components. As both components (i) and (ii) are present in the polymer blend, each component must be in an amount less than 100 wt %. In some examples, the lignin component is present in the polymer blend material in an amount of about 5 wt %, 10 wt %, 15 wt %, 20 wt %, 25 wt %, 30 wt %, 35 wt %, 40 wt %, 45 wt %, or 50, wt %, or in an amount within a range bounded by any two of the foregoing exemplary values, e.g., at least or above 5 wt %, 7 wt %, or 10 wt %, and up to 15 wt %, 20 wt %, 25 wt %, 30 wt %, 35 wt %, or 40 wt % by total weight of components (i) and (ii). In more particular embodiments, the lignin component is present in an amount of 10 wt %, or 15 wt %, or 20 wt %, or 25 wt %, or 30 wt %, and up to 35 wt % by total weight of the polymer blend components.

Lignin

Any commercially available lignin may be used. In one example, the lignin source can be from commercial feedstocks such as switchgrass, hybrid and tulip poplar, and corn stover components including any variety, cultivar, hybrid or derivatives thereof. In another example, the lignin source may be any variety, cultivar, hybrid or derivative thereof from Miscanthus, Miscane and Wide Hybrids thereof, Sugar Cane, Energy Cane, Short Rotation Hardwood Crops (e.g., Poplar, Cottonwood, Aspen), Sorghum (including Biomass Sorghum, Sorghum Sudan, Sweet Sorghum), Hemp, Agricultural Residues (including Wheat Straw, Rice Hulls, Sugarcane Bagasse), Eucalyptus, Native Warm Season Grasses (including Bluestem, Fescue, Elephant Grass), Pine, Ash, Balsam Fir, Basswood, Beech, Birch, Blackgum, Boxelder, Buckeye, Butternut, Catalpa, Cedar, Cherry, Coffee Tree, Cucumber, Cypress, Elm, Fir, Gum, Hackberry, Hemlock, Hickory, Hop Hornbeam, Larch, Locust, Maple, Oak, Persimmon, Redbay, Sassafras, Sourwood, Spruce, Sugarberry, Sweetgum, Sycamore, Tamarack, Walnut, Water Tupelo, and Willow. Besides the natural variation of lignins, there can be further compositional variation based on the manner in which the lignin has been processed.

For example, the lignin can be a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin present in biomass to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfate (depending on pH), along with a counterion, is reacted with lignin to form a lignin bearing sulfonate ($SO_3H$) groups. The sulfonate groups impart a substantial degree of water-solubility to the sulfite lignin. There are several types of sulfur-free lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. These lignins can also be thermally devolatilized to produce a variant with less aliphatic hydroxyl groups, and molecularly restructured forms with an elevated softening point. Any one or more of the foregoing types of lignins may be used (or excluded) as a component in the method described herein for producing a polymer blend.

In one example, the less harsh and damaging organosolv process can be used for delignification (i.e., as compared to using strong acid or base), so as to provide a lignin providing higher value-added applications, including manufacturing of the presently disclosed polymer blends.

Compatibilizing Agent

The polymer blend material described hereinbelow includes a component other than the components (i) and (ii). In one example, the compatibilizing agent can be a polymeric compatibilizing agent. The compatibilizing agent can assist in the dispersion and/or distribution and/or miscibility of one component with or within the other component. In one example, the compatibilizing agent can modify the physical properties (e.g., impact strength, tensile strength, modulus, and/or elongation at break). Example of suitable compatibilizing agents include, for example, ether-containing polymers (e.g., polyalkylene oxides), ether-containing copolymers, polyalkyl-maleic anhydride copolymers, vinyl-maleic anhydride copolymers, polyalkylhydroxyl copolymers, olefin-vinyl acetate copolymers, ABS-maleic anhydride copolymers. Other examples of compatibilizing agents include polyethylene oxide, polyvinyl alcohol, polyvinyl acetate, ethylene vinylacetate copolymer, ethylene-vinyl acetate-carbon monoxide copolymer, styrene-maleic anhydride copolymer, polymethylmethacrylate polymer, polycarbonate polymer, maleic anhydride grafted styrene-ethylene-butadiene-styrene block copolymer, polybutyl-maleic anhydride copolymer, maleic anhydride grafted acrylonitrile-butadiene-styrene copolymer, and maleic anhydride grafted ethylene-vinylacetate copolymer, polyethylene glycol or a copolymer thereof, polyethylene oxides, polypropylene oxides, polybutylene oxides, and copolymers thereof or with ethylene, propylene, or allyl glycidyl ether, and may additionally contain solvents or plasticizers in combination with the aforementioned compatibilizing agents. Other examples of compatibilizing agents include maleic anhydride, phthalic anhydride, succinic anhydride or other anhydrides and dianhydrides. Still other examples of compatibilizing agents include an acrylonitrile-butadiene copolymer (also known as nitrile rubber) or an acrylonitrile-butadiene-styrene copolymer having a butadiene content of butadiene at least 50% by weight, which may be considered a high butadiene ABS polymer. In one example, the nitrile rubber is crosslinked.

In one example, the compatibilizing agent is a copolymer of butadiene and acrylonitrile, a copolymer of styrene and acrylonitrile, or mixtures thereof. In one example, polyethylene oxide having an average molecular weight of between about 100,000 and 5,000,000 can be used. In another example, polyethylene glycol having a molecular weight of between about 5,000 and 50,000 can be used. In another example, polyethylene glycol having a molecular weight of between about 7,000 and 40,000 or between about 10,000 and 20,000 can be used. In still another example, polyethylene glycol having a molecular weight of between about 7,000 and 10,000 or between about 20,000 and 40,000 can be used. In one example, the combination of compatibilizing agents can include an acrylonitrile-butadiene copolymer, an acrylonitrile-butadiene-styrene copolymer having a butadiene content of at least 50% by weight, and polyethylene glycol with a molecular weight between about 5,000 and 50,000. In another example, the combination of compatibilizing agents can include an acrylonitrile-butadiene copolymer, an acrylonitrile-butadiene-styrene copolymer with a butadiene content of at least 50% by weight, and maleic anhydride. In another example, the combination of compatibilizing agents can include an acrylonitrile-butadiene copolymer, an acrylonitrile-butadiene-styrene copolymer with a butadiene content of at least 50% by weight, and phthalic anhydride. In another example, the combination of compatibilizing agents can include an acrylonitrile-butadiene copolymer and an acrylonitrile-butadiene-styrene copolymer with a butadiene content of at least 50% by weight.

As a compatibilizing agent, the acrylonitrile-butadiene-styrene (ABS) copolymer having a butadiene content of at least 50% by weight can have any of a wide range of weight-average molecular weights (Mw), such as precisely, about, at least, above, up to, or less than, for example, 2,500 g/mol, 3,000 g/mol, 5,000 g/mol, 10,000 g/mol, 50,000 g/mol, 100,000 g/mol, 150,000 g/mol, 200,000 g/mol, 300,000 g/mol, 400,000 g/mol, 500,000 g/mol, or 1,000,000 g/mol, or a molecular weight within a range bounded by any two of the foregoing exemplary values. As a compatibilizing agent, the ABS may also have any of a wide range of number-average molecular weights Mn, wherein Mn can correspond to any of the numbers provided above for Mw. The ABS here can be from any commercial supplier. The ABS, as a compatibilizing agent, also has a butadiene content of at least 50% by weight and, in another example, the butadiene content can be at least 55%, 60%, 65%, 70%, 75%, or 80%. And the acrylonitrile-butadiene copolymer can include an acrylonitrile content from about 30% to about 45%.

The amount (i.e., weight percent, or "wt %") of compatibilizing agent with respect to the weight sum of components (i), (ii), and (iii) or with respect to the weight of the final polymer blend can be any suitable amount that achieves the desired mechanical properties of the blend, but typically no more than about 1 wt %, 3 wt %, 5 wt %, 7 wt %, 10 wt %, 12 wt %, 15 wt %, 20 wt %, 25 wt %, 30 wt %, or 35 wt %. In other examples, the compatibilizing agent can be in an amount of precisely, about, at least, up to, or less than, for example, 0.5 wt %, 1.0 wt %, 1.5 wt %, 2.0 wt %, 2.5 wt %, 3.0 wt, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.5 wt %, 11.0%, 11.5 wt %, 12.0 wt %, 12.5 wt %, 13.0 wt %, 13.5 wt %, 14.0 wt % 14.5 wt %, 15.0 wt %, 15.5 wt %, 16.0 wt %, 16.5 wt %, 17.0 wt %, 17.5 wt %, 18.0 wt %, 18.5 wt %, 19.0 wt %, 19.5 wt %, 20.0 wt %, 20.5 wt %, 21.0 wt %, 21.5 wt %, 22.0 wt %, 22.5 wt %, 23.0 wt %, 23.5 wt %, 24.0 wt %, 24.5 wt % or 25.0 wt % or in an amount within a range bounded by any two of the foregoing values. In one example, the weight of the thermoplastic acrylonitrile containing copolymer, e.g., ABS, as component (i), present in the blend is greater than the weight of lignin present in the blend. In one example, the weight of ABS (component (i)) present in the blend is greater than the combined weight of lignin and compatibilizing agent present in the blend.

Additives

The polymer blend material described herein optionally includes at least one additive (component (iv)) in addition to components (i), (ii) and (iii). The additive can be selected from among a range of types of additives in order to impart specific attributes to the polymer blend material, such as for example, but not limited to, resistance to ultraviolet (UV) radiation, resistance to oxidation, flame resistance, a desired color, reduced surface static charge buildup, or a low surface friction as determined by the intended end use application of the polymer material. Any of these additives may be included singly or in combination with any or all of the other additives to impart the desired balance of overall properties to the polymer blend material.

In one example, the additive may be an ultraviolet radiation (UV) stabilizer. The UV stabilizer may be any compound commonly used to impart UV resistance to polymers. More specifically, the UV stabilizer may be a benzotriazole, benzophenol, or sterically hindered amine light stabilizer (HALS), or a combination of any of these materials. The UV stabilizer can be present in the polymer blend material in an amount sufficient to provide adequate UV resistance for the intended use of the material. Relative to the total weight of components (i), (ii), (iii) and (iv) the UV stabilizer may be present at a level of about 0 to about 2% by weight. In another example, the UV stabilizer may be present in an amount of from about 0.1% to about 2% by weight. The UV stabilizer may be added alone or in combination with other additives including, but not limited to, antioxidants, flame retardants, colorants, slip agents, and anti-static agents.

In another example, the additive may be an antioxidant compound. The antioxidant compound may be any compound commonly used to impart resistance to oxidation to plastics. More specifically, the antioxidant compound may be selected from the classes of compounds of phosphite esters or sterically hindered phenols, alone or in combination. The antioxidant may be present in an amount sufficient to impart the required degree of oxidative stability to the polymer blend material. More specifically, relative to the total weights of components (i), (ii) and (iii), the antioxidant may be present in an amount of from about 0% to about 2% by weight. In another example, the antioxidant may be present in an amount of from about 0.1% to about 2% by weight. The antioxidant may be added to the polymer blend material alone or in combination with any of the other additives including, but not limited to, UV stabilizers, flame retardants, colorants, slip agents, and anti-static agents.

In another example, the additive may be a flame retardant. The flame retardant may be any compound commonly used to retard the combustion of plastics. More specifically, the flame retardant may be selected from the classes of compounds of brominated organic compounds, chlorinated organic compounds, or organophosphates. The flame retardant compound may be present in an amount sufficient to impart the required degree of resistance to combustion required for the intended application of the polymer blend material. More specifically, relative to the total weights of components (i), (ii) and (iii), the flame retardant may be present in an amount of from about 0% to about 2% by weight. In another example, the flame retardant may be present in an amount of from about 0.1% to about 2% by weight. The flame retardant may be added to the polymer blend material alone or in combination with any of the other additives including but not limited to UV stabilizers, antioxidants, colorants, slip agents, and anti-static agents.

In another example, the additive may be a colorant. The colorant may be a black material such as carbon black, a white material such as titanium dioxide or zinc oxide, or any colored pigment commonly used to be impart color to polymers. More than one colorant additive may be used in combination in order to produce the desired final color of the polymer blend material. The colorant(s) may be added in an amount sufficient to impart the desired color to the polymer blend material. More specifically, the colorant(s) may be added in an amount relative to the total weight of components (i), (ii) and (iii) of from about 0% to about 5% by weight. In another example, the colorant(s) may be added in an amount relative to the total weight of components (i), (ii) and (iii) of from about 0.1% to about 5% by weight, or from about 0.1% to about 1% by weight. The colorants may be used alone or in combination with any other additives including, but not limited to, UV stabilizers, antioxidants, flame retardants, slip agents, and anti-static agents.

In another example, the additive may be a slip agent. The slip agent may be any material commonly used in plastic to reduce surface friction. More specifically the slip agent may be selected from the classes of fatty acid amides, fatty acid esters, or metallic stearates (e.g., zinc stearate). The slip agent may be present at a level sufficient to produce the desired surface friction properties for the given application. More specifically, relative to the total weights of components (i), (ii) and (iii), the slip agent may be present in an amount of from about 0% to about 2% by weight. In another example, the slip agent may be present in an amount of from about 0.1% to about 2% by weight. The slip agent may be used alone or in combination with any other additives including but not limited to UV stabilizers, antioxidants, flame retardants, colorants, and anti-static agents.

In another example, the additive may be an anti-static agent. The anti-static agent may be any material commonly used in plastics to reduce the accumulation of surface static charge. More specifically, the anti-static agent may be selected from the classes of ethoxylated fatty acid amines, diethanolamines, or glycerol monostearate. The anti-static agent may be present at a level sufficient to produce the desired level of surface static charge accumulation. More specifically, relative to the total weights of components (i), (ii) and (iii), the anti-static agent may be present in an amount of from about 0% to about 2% by weight. In another example, the anti-static agent may be present in an amount of from about 0.1% to about 2% by weight. The anti-static agent may be used alone or in combination with any other additives including but not limited to UV stabilizers, antioxidants, flame retardants, colorants, and slip agents.

Impact strength of the presently disclosed polymer blends depends on its ability to develop an internal force multiplied by the deformation as a result of impact. The impact strength is dependent on the shape of a part prepared from the presently disclosed polymer blends, which, can enhance its ability to absorb impact. The presently disclosed polymer blends and articles made therefrom containing at least components (i), (ii), (iii) and optionally (iv) is envisioned to possesses an impact strength of 5 kJ/m$^2$ or greater, (notched Izod, according to ASTM D256), and/or a tensile strength of at least or above 1 MPa, when the composition is free from solvents or not substantially solvated, and more preferably at least or above 10, 15, 20, or 30 MPa.

The polymer blend material and articles made therefrom containing at least components (i), (ii), (iii) and optionally (iv) preferably possesses an elongation at break of at greater than 2%. In one example, an elongation at break of greater than 2%, 3%, 4%, 5%, 6%, 7%, 8%, 9%, or 10%, or greater.

In another aspect, the instant disclosure is directed to methods for producing the polymer blend material described above. In the method, the components (i), (ii), (iii) and optionally (iv) can be mixed and homogeneously blended to form the polymer blend material. Any one of the components (i), (ii), (iii), and/or (iv) can be included in liquid form (if applicable), in solution form, or in particulate form. In the case of particles, the particles may be, independently, nanoparticles (e.g., at least 1, 2, 5, or 10 nm, and up to 20, 50, 100, 200, or 500 nm), microparticles (e.g., at least 1, 2, 5, or 10 μm, and up to 20, 50, 100, 200, or 500 μm), or macroparticles (e.g., above 500 μm, or at least or up to 1, 2, 5, 25, 50, or 100 mm). Typically, if any of the components (i)-(iv) is provided in particle form, the polymeric particles are melted or softened by appropriate heating to allow homogeneous blending of polymers and uniform dispersion of particles. The components can be homogeneously blended by any of the methodologies known in the art for achieving homogeneous blends of solid, semi-solid, gel, paste, or liquid mixtures. Some examples of applicable blending processes include simple or high speed mixing, compounding, extrusion, or ball mixing, all of which are well-known in the art.

By being "homogeneously blended" is meant that, in macro (e.g., millimeter) scale, no discernible regions of at least components (i) and (ii) exist, although discernible regions of components (iii) and/or (iv) may or may not exist. One or more of the components remains as solid phase, either in the elemental state or in the crystalline lamella phase. In other words, the homogeneous blend possesses a modified or compatibilized phase structure (not necessarily a single phase structure, but often with retained but shifted Tg associated with individual phases) for at least components (i) and (ii). The modified-phase structure generally indicates near homogeneous integration at micro-scale or near the molecular level without losing each component's identity.

Component (iv) may be present in homogeneous or non-homogeneous form. In the case in which component (iv) is a non-homogeneous component, the instantly described polymer blend having components (i), (ii), and (iii) can be considered a "homogeneous matrix" in which the component (iv) is incorporated. Preferably, all of the components retain their segmental identity and components are well dispersed in the nanometer scale. In that case, component (i) can provide impact resistance or toughness, component (ii) can provide rigidity, and component (iii) can provide some level of synergy in the interaction between phases (i) and (ii). For example, compatibilizing agent (component (iii)), in one example, functions as an interfacial adhesion promoter and/or materials performance enhancer.

The presently disclosed polymer blend material is typically subjected to a shape-forming process to produce a desired shaped article. The shape-forming process can include, for example, molding (e.g., pour, injection, or compression molding), extrusion, melt-spinning, melt pressing, or stamping, all of which are well known in the art.

The article containing the polymer blend described above can be one in which some degree of impact strength and/or toughness is provided, along with high mechanical strength, and optionally particular end use properties such as UV stability, oxidative stability, color, controlled surface friction, or controlled surface static charge accumulation. The blend can be further reinforced with, for example, carbon, ceramic, glass, or metallic fibers to produce composite parts.

The article may be used as or included in any useful component, such as a structural support, the interior or exterior of an automobile, furniture, a tool or utensil, or a high strength sheet or plate.

The following examples are provided as exemplary and are not to be used to limit the scope of any of the claims.

EXAMPLES

Materials: The below examples used the following materials in various combinations. The thermoplastic acrylonitrile containing copolymer (component (i)) used was an ABS resin, MAGNUM™ 3325 ABS, which is manufactured by Trinseo Plastics of Auburn Hills, Michigan. The lignin (component (ii)) used was a Kraft lignin. The compatibilizers (component (iii)) that were used are as follows: (I) crosslinked nitrile rubber, ZEALLOY™ 1422a, which is available from Zeon Chemicals of Louisville, KY, (II) high butadiene ABS resin (>50 wt % butadiene content), ELIX™ 158i, which is available from Elix Polymers of Tarragona, Spain and (III) phthalic anhydride. The additives (component (iv)) that were used are as follows:

a) Zeolite (odor reducer), ZEOFLAIR® 810 zeolite, which is available from Maroon Group, of Avon, Ohio
b) Carbon black (colorant), Cabot PLASBLAK® UN2010, which is available from Cabot Corporation of Boston, Massachusetts
c) Carbon black (colorant), Cabot PLASBLAK® EV430005, which is available from Cabot Corporation of Boston, Massachusetts
d) Croda INCROSLIP™ G (slip agent), which is a specialty release and anti-scratch agent of vegetable origin available from Croda Incorporated of Edison, New Jersey
e) Croda INCROMOLD™ T (mold release agent), which is a mold release agent available from Croda Incorporated of Edison, New Jersey
f) ABR, which is an All Black (micronized SBR) Rubber available from Entech Incorporated of Middlebury, Indiana Preparation: The acrylonitrile-butadiene-styrene resin and the compatibilizer polymer were dried per the manufacturer's suggestion. The lignin was dried overnight at 80° C. Dry raw materials were added to a large container in the prescribed mass ratios to a mass of 4 kg, and blended by hand to produce a well dispersed dry mixture. The dry mixture was melt compounded using a 27 mm Leistritz twin screw co-rotating extruder. The screw configuration is typical of that used for melt compounding common thermoplastics. A thermal profile was established in the extruder barrel with a maximum barrel temperature between about 210° C. and about 240° C. The dry mixture was fed continuously to the extruder via a screw feeder at a constant rate. The extruder speed was maintained in the range of 30 to 200 rpm. The compounded ABS copolymer/lignin blend was extruded through a strand die into a water bath at about 20° C. and conveyed into a cutter, which chopped the strands into pellets.

Test Specimen Preparation:

Molding: The ABS/lignin blend pellets were injection molded into ASTM D638tensile and ASTM D256 impact testing coupons on a 40 ton Battenfeld injection molding machine. The injection molding conditions were within the range of those typically used to injection mold ABS resins.

Testing: Samples were tested for notched izod impact properties per ASTM method D256. Table 1 below sets forth the tested compositions.

TABLE 1

ABS/Lignin blend compositions.

| Example | ABS (wt %) | Lignin (wt %) | Compatibilizer (wt %) | Additive (wt %) | Property Imparted | Notched Izod Impact Strength (kJ/m$^2$) |
|---|---|---|---|---|---|---|
| 1 | 80 | 20 | none | none | comparative example | 2.77 |
| 2 | 64 | 20 | (I) 3%, (II) 12% | (a) 1% | low odor | 7.60 |
| 3 | 64.5 | 20 | (I) 3%, (II) 12% | (b) 0.5% | black color | 7.77 |
| 4 | 64 | 20 | (I) 3%, (II) 12% | (b) 1% | black color | 7.49 |
| 5 | 64 | 20 | (I) 3%, (II) 12% | (c) 1% | black color | 8.28 |
| 6 | 64 | 20 | (I) 3%, (II) 12% | (h) 1% | black color, toughness | 8.47 |
| 7 | 62.5 | 20 | (I) 3%, (II) 12%, (III) 2% | (d) 0.5% | improved processing | 7.88 |
| 8 | 62.5 | 20 | (I) 3%, (II) 12%, (III) 2% | (e) 0.5% | mold release | 8.30 |

Results:

Using the presently disclosed method, articles formed from melt blending an amount of thermoplastic acrylonitrile-butadiene-styrene (ABS) copolymer, an amount of lignin, at least one compatibilizing agent, and optionally at least one additive so as to form a substantially homogeneous blend resulted in articles having improved impact strength and/or elongation at break compared to an article made from the same ABS copolymer and the same lignin, at the same or greater total lignin content respectively, without the presence of the compatibilizing agent. Example 1, prepared without any compatibilizing agents, and with 20% by weight lignin content, had a notched izod impact strength of 2.77 kJ/m$^2$. The materials in Examples 2-8, containing compatibilizing agents, as described above, all exhibited notched izod impact strengths >7 kJ/m$^2$, which is 2-3× greater than the reference comparative Example 1. Furthermore, Example 2 contained an odor absorbing zeolite agent, Examples 3, 4, 5 and 6 had a uniform black color, Example 7 had improved molding and compounding performance, Example 8 had reduced adhesion to the metal mold to facilitate mold release during processing.

While illustrative embodiments have been illustrated and described, it will be appreciated that various changes can be made therein without departing from the spirit and scope of the claimed subject matter.

What is claimed is:

1. A thermoplastic acrylonitrile containing copolymer/lignin blend comprising:
   (i) an amount of lignin, wherein the lignin is selected from a kraft lignin, a sulfite lignin, a sulfur-free lignin, or combinations thereof and sourced from a hardwood or softwood feedstock;
   (ii) an amount of a thermoplastic acrylonitrile containing copolymer, wherein the thermoplastic acrylonitrile containing copolymer is a first acrylonitrile-butadiene-styrene copolymer; and
   (iii) an amount of a compatibilizing agent, wherein the compatibilizing agent includes at least a dianhydride, and a second acrylonitrile, butadiene and styrene copolymer having a butadiene content of at least 50% by weight, which is a different copolymer than the first acrylonitrile-butadiene-styrene copolymer, and
   wherein the lignin is present in an amount from about 5 to 50 wt % by total weight of components (i) and (ii), components (i) and (ii) are present together in an amount from 75 wt % or greater by weight of the total weight of the blend, and the compatibilizing agent comprises from about 0.5 to 25% by weight of the total weight of the blend.

2. The blend of claim 1, wherein the compatibilizing agent further includes at least phthalic anhydride and further includes nitrile rubber and the acrylonitrile-butadiene-styrene copolymer having a butadiene content of butadiene at least 50% by weight.

3. The blend of claim 2, wherein the compatibilizing agent comprises from about 14 to 23% by weight of the total weight of the blend.

4. The blend of claim 1, wherein the lignin is selected from a kraft lignin or an organosolv lignin.

5. The blend of claim 1, wherein the compatibilizing agent further includes one or more of polyalkylene oxides, ether-containing copolymers, polyalkyl-maleic anhydride copolymers, vinyl-maleic anhydride copolymers, polyalkylhydroxyl copolymers, olefin-vinyl acetate copolymers, a polyvinyl alcohol, a polyvinyl acetate, a copolymer of ethylene and vinyl acetate, a copolymer of ethylene, vinyl acetate and carbon monoxide, a maleic anhydride grafted copolymer of ethylene and vinyl acetate, a maleic anhydride grafted acrylonitrile-butadiene-styrene copolymer, or a copolymer of styrene and maleic anhydride.

6. The blend of claim 1, wherein the compatibilizing agent further includes one or more of a polymethylmethacrylate, a polycarbonate, or maleic anhydride grafted styrene-ethylene-butadiene-styrene block copolymer, polyethylene glycol or a copolymer thereof, polyethylene oxides, polypropylene oxides, polybutylene oxides, and copolymers thereof or with ethylene, propylene, or allyl glycidyl ether.

7. The blend of claim 1 further comprising an amount of at least one additive selected from a UV stabilizer, an antioxidant, a flame retardant, a colorant, a slip agent, or an anti-static agent.

8. The blend of claim 7, wherein the at least one additive is present in an amount from about 0.1% to about 5% of the total weight of the polymer blend material.

9. The blend of claim 7, wherein the additive is the UV stabilizer, which is selected from a benzotriazole, a benzophenol, a sterically hindered amine light stabilizer, or any combination thereof.

10. The blend of claim 7, wherein the additive is the antioxidant, which is a phosphite ester, a sterically hindered phenol, or a combination thereof.

11. The blend of claim 7, wherein the additive is the flame retardant, which is a brominated organic compound or an organic phosphate.

12. The blend of claim 7, wherein the additive is the colorant, which is selected from carbon black, titanium dioxide, or zinc oxide.

13. The blend of claim 7, wherein the additive is the slip agent, which is a fatty acid amide, a fatty acid ester, a metallic stearate, zinc stearate, or any combination thereof.

14. The blend of claim 7, wherein the additive is the anti-static agent, which is an ethoxylated fatty acid amine, a diethanolamine, glycerol monostearate, or any combination thereof.

15. The blend of claim 1, wherein the compatibilizing agent further includes phthalic anhydride and the second acrylonitrile, butadiene and styrene copolymer.

16. The blend of claim 1 wherein the hardwood or softwood feedstock is selected from a hardwood feedstock.

17. A method for preparing a thermoplastic acrylonitrile containing copolymer/lignin copolymer composite comprising:
   melt blending (i) a thermoplastic acrylonitrile containing copolymer, wherein the thermoplastic acrylonitrile containing copolymer is a first acrylonitrile-butadiene-styrene copolymer, (ii) lignin, wherein the lignin is selected from a kraft lignin, a sulfite lignin, a sulfur-free lignin, or combinations thereof and sourced from a hardwood or softwood feedstock, and (iii) a compatibilizing agent, wherein the compatibilizing agent includes at least a dianhydride, and a second acrylonitrile, butadiene and styrene copolymer having a butadiene content of at least 50% by weight, which is a different copolymer than the first acrylonitrile-butadiene-styrene copolymer,
   forming a substantially homogeneous blend of (i)-(iii); and
   forming a composite article from the substantially homogeneous blend, wherein the composite article has a notched izod impact strength of at least 2 kJ/m$^2$ and/or an elongation at break of at least 2% and wherein the lignin is present in an amount from about 5 to 50 wt % by total weight of components (i) and (ii), components (i) and (ii) are present together in an amount from 75 wt % or greater by weight of the total weight of the blend, and the compatibilizing agent comprises from about 0.5 to 25% by weight of the total weight of the blend.

18. The method of claim 17, wherein melt blending of (i), (ii), and (iii) includes melt blending of (i), (ii), (iii) and (iv) at least one additive selected from a UV stabilizer, antioxidant, flame retardant, colorant, slip agent, or an anti-static agent.

19. A composite article manufactured according to the method of claim 17.

20. The method of claim 17, wherein the composite article is an interior or exterior automotive component.

21. A thermoplastic acrylonitrile containing copolymer/lignin blend comprising:
   (i) an amount of lignin, wherein the lignin is selected from a kraft lignin and sourced from a hardwood feedstock;
   (ii) an amount of a thermoplastic acrylonitrile containing copolymer, wherein the thermoplastic acrylonitrile containing copolymer is a first acrylonitrile-butadiene-styrene copolymer; and
   (iii) an amount of a compatibilizing agent, wherein the compatibilizing agent is phthalic anhydride and a second acrylonitrile, butadiene and styrene copolymer having a butadiene content of at least 50% by weight, which is a different copolymer than the first acrylonitrile-butadiene-styrene copolymer, and wherein the kraft lignin is present in an amount from about 15 to 50 wt % by total weight of components (i) and (ii), components (i) and (ii) are present together in an amount from 75 wt % or greater by weight of the total weight of the blend, and the compatibilizing agent comprises from about 5 to 25% by weight of the total weight of the blend.

22. A composite article comprising:

a thermoplastic acrylonitrile containing copolymer/lignin blend comprising:
   (i) an amount of lignin, wherein the lignin is selected from a kraft lignin, a sulfite lignin, a sulfur-free lignin, or combinations thereof and sourced from a hardwood or softwood feedstock,
   (ii) an amount of a thermoplastic acrylonitrile containing copolymer, wherein the thermoplastic acrylonitrile containing copolymer is a first acrylonitrile-butadiene-styrene copolymer; and
   (iii) an amount of a compatibilizing agent, wherein the compatibilizing agent includes at least a dianhydride, and a second acrylonitrile, butadiene and styrene copolymer having a butadiene content of at least 50% by weight, which is a different copolymer than the first acrylonitrile-butadiene-styrene copolymer, and wherein the lignin is present in an amount from about 5 to 50 wt % by total weight of components (i) and (ii), components (i) and (ii) are present together in an amount from 75 wt % or greater by weight of the total weight of the blend, and the compatibilizing agent comprises from about 0.5 to 25% by weight of the total weight of the blend, and wherein the composite article is an exterior or interior automotive component.

* * * * *